(12) United States Patent
Boss et al.

(10) Patent No.: US 10,764,206 B2
(45) Date of Patent: Sep. 1, 2020

(54) ADJUSTING NETWORK BANDWIDTH BASED ON AN ANALYSIS OF A USER'S COGNITIVE STATE

(71) Applicant: International Business Machines Corporation, Armonk, NY (US)

(72) Inventors: Gregory J. Boss, Saginaw, MI (US); Jeremy R. Fox, Georgetown, TX (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 15/228,697

(22) Filed: Aug. 4, 2016

(65) Prior Publication Data
US 2018/0041448 A1 Feb. 8, 2018

(51) Int. Cl.
| | | |
|---|---|---|
| H04L 12/24 | (2006.01) | |
| H04L 12/911 | (2013.01) | |
| H04L 12/927 | (2013.01) | |
| H04W 4/70 | (2018.01) | |
| H04W 4/00 | (2018.01) | |
| H04W 4/38 | (2018.01) | |

(52) U.S. Cl.
CPC .......... *H04L 47/821* (2013.01); *H04L 47/80* (2013.01); *H04W 4/00* (2013.01); *H04W 4/70* (2018.02); *H04W 4/38* (2018.02)

(58) Field of Classification Search
CPC ........ H04L 47/821; H04L 47/80; H04W 4/70; H04W 4/00; H04W 4/38

USPC ........................................................ 709/226
See application file for complete search history.

(56) References Cited

U.S. PATENT DOCUMENTS

| | | | |
|---|---|---|---|
| 5,983,261 A | 11/1999 | Riddle | |
| 7,619,971 B1 | 11/2009 | Siva et al. | |
| 8,014,570 B2 | 9/2011 | Le Saint et al. | |
| 8,687,576 B2 | 4/2014 | Braennstroem et al. | |
| 8,764,654 B2 | 7/2014 | Chmiel et al. | |
| 9,147,164 B2 | 9/2015 | Chester et al. | |
| 2005/0223237 A1* | 10/2005 | Barletta ................. | G06F 3/011 713/186 |
| 2006/0122834 A1 | 6/2006 | Bennett | |

(Continued)

FOREIGN PATENT DOCUMENTS

WO 2015194933 A1 12/2015

OTHER PUBLICATIONS

Tseng et al., "Securing Traffic at QoS-aware Residential Gateway Using Biometric Signatures," IEEE Transactions on Consumer Electronics, vol. 54, No. 3, Aug. 2008, pp. 1148-1156.

*Primary Examiner* — Ario Etienne
*Assistant Examiner* — Elizabeth Kassa
(74) *Attorney, Agent, or Firm* — Yee & Associates, P.C.

(57) ABSTRACT

Adjusting network bandwidth is provided. An indication that a client device corresponding to a user is using a level of bandwidth of a network that the computer and client device are connected to is received. An indication via a set of biometric sensors communicatively coupled to the client device that the user is experiencing an increased stress level also is received. The level of bandwidth allocated to the client device of the user is increased based on the received indication that the user is experiencing the increased stress level.

14 Claims, 6 Drawing Sheets

(56) References Cited

U.S. PATENT DOCUMENTS

| | | | | |
|---|---|---|---|---|
| 2010/0100914 | A1* | 4/2010 | Sugiyama | H04L 65/4069 |
| | | | | 725/109 |
| 2014/0114753 | A1* | 4/2014 | Xiao | G06Q 30/02 |
| | | | | 705/14.49 |
| 2015/0254726 | A1* | 9/2015 | Cassidy | G06Q 30/0269 |
| | | | | 705/14.58 |
| 2015/0282180 | A1 | 10/2015 | Owen et al. | |
| 2015/0341411 | A1* | 11/2015 | Huber | H04L 65/4092 |
| | | | | 709/231 |
| 2016/0080448 | A1* | 3/2016 | Spears | H04L 65/602 |
| | | | | 709/219 |
| 2016/0219462 | A1 | 7/2016 | Anderson et al. | |
| 2017/0289622 | A1* | 10/2017 | Roch | H04N 21/44218 |

* cited by examiner

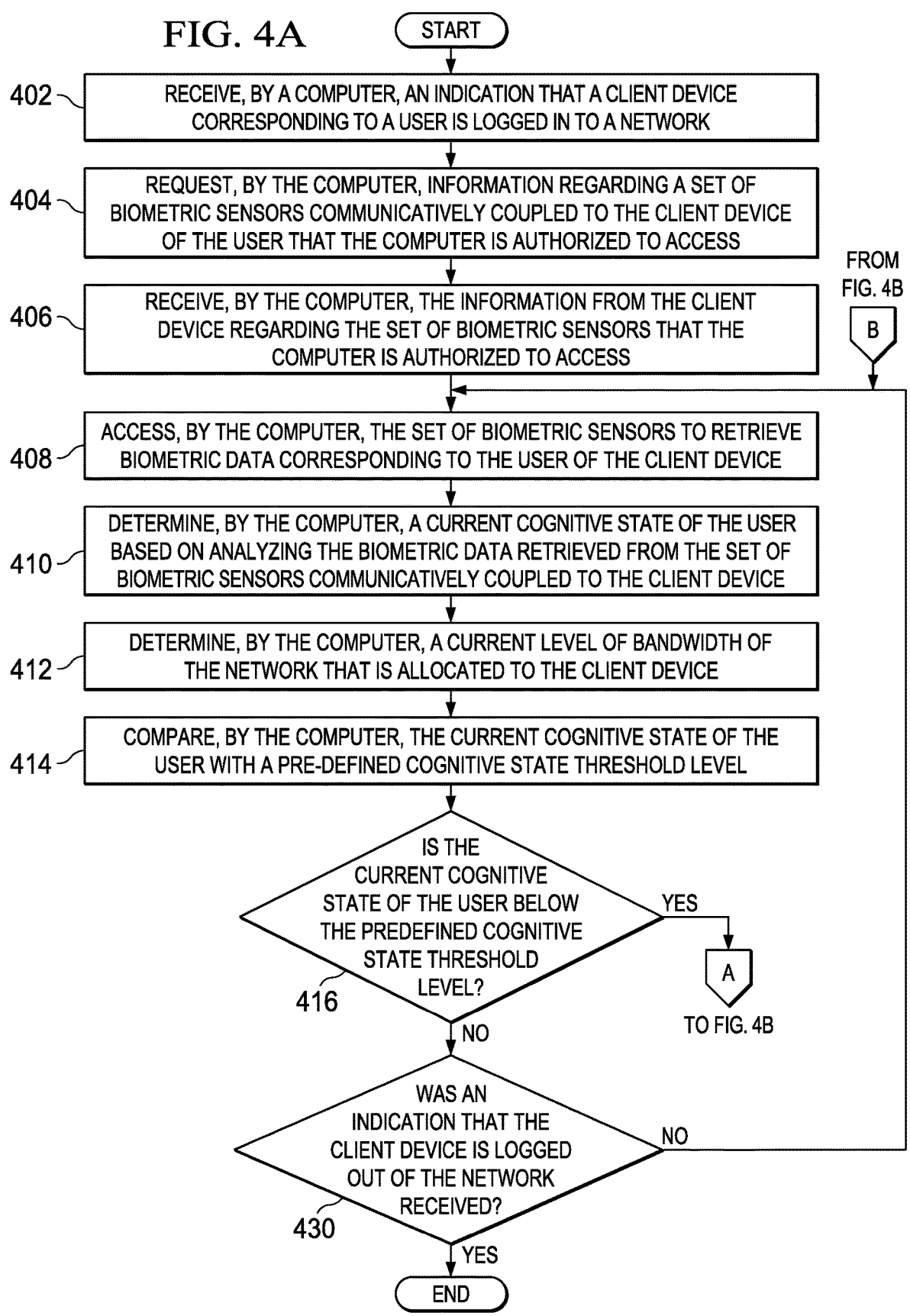

ADJUSTING NETWORK BANDWIDTH BASED ON AN ANALYSIS OF A USER'S COGNITIVE STATE

BACKGROUND

1. Field

The disclosure relates generally to data networks and more specifically to adjusting an amount or level of network bandwidth used by a network device based on analyzing a cognitive state of a user of the network device.

2. Description of the Related Art

Commercial, industrial, and consumer data networks are increasingly stressed with load and large amounts of data. As networks grow, so does the amount of data being passed over the networks. As networks are expanded to relieve heavy load issues, subsequent increases in data volume also occur to further consume the bandwidth of these newer, larger networks. This is a continuous cycle of ever increasing network size balanced with growing network usage requirements.

SUMMARY

According to one illustrative embodiment, a computer-implemented method for adjusting network bandwidth is provided. A computer receives an indication that a client device corresponding to a user is using a level of bandwidth of a network that the computer and client device are connected to. The computer also receives an indication via a set of biometric sensors communicatively coupled to the client device that the user is experiencing an increased stress level. The computer increases the level of bandwidth allocated to the client device of the user based on the received indication that the user is experiencing the increased stress level. According to other illustrative embodiments, a computer system and computer program product for adjusting network bandwidth are provided.

BRIEF DESCRIPTION OF THE DRAWINGS

FIGS. 4A-4B are a flowchart illustrating a process for a server device in accordance with an illustrative embodiment.

DETAILED DESCRIPTION

Figure 1:
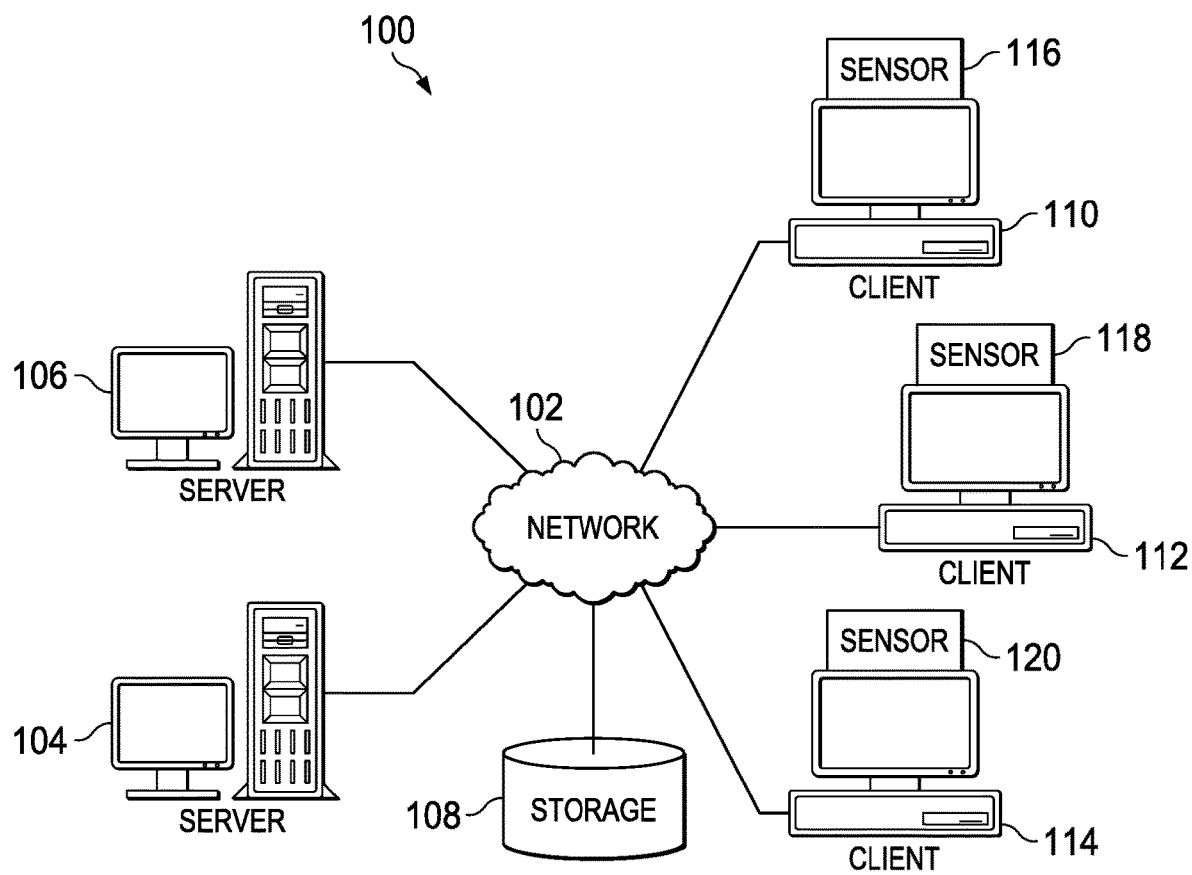
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
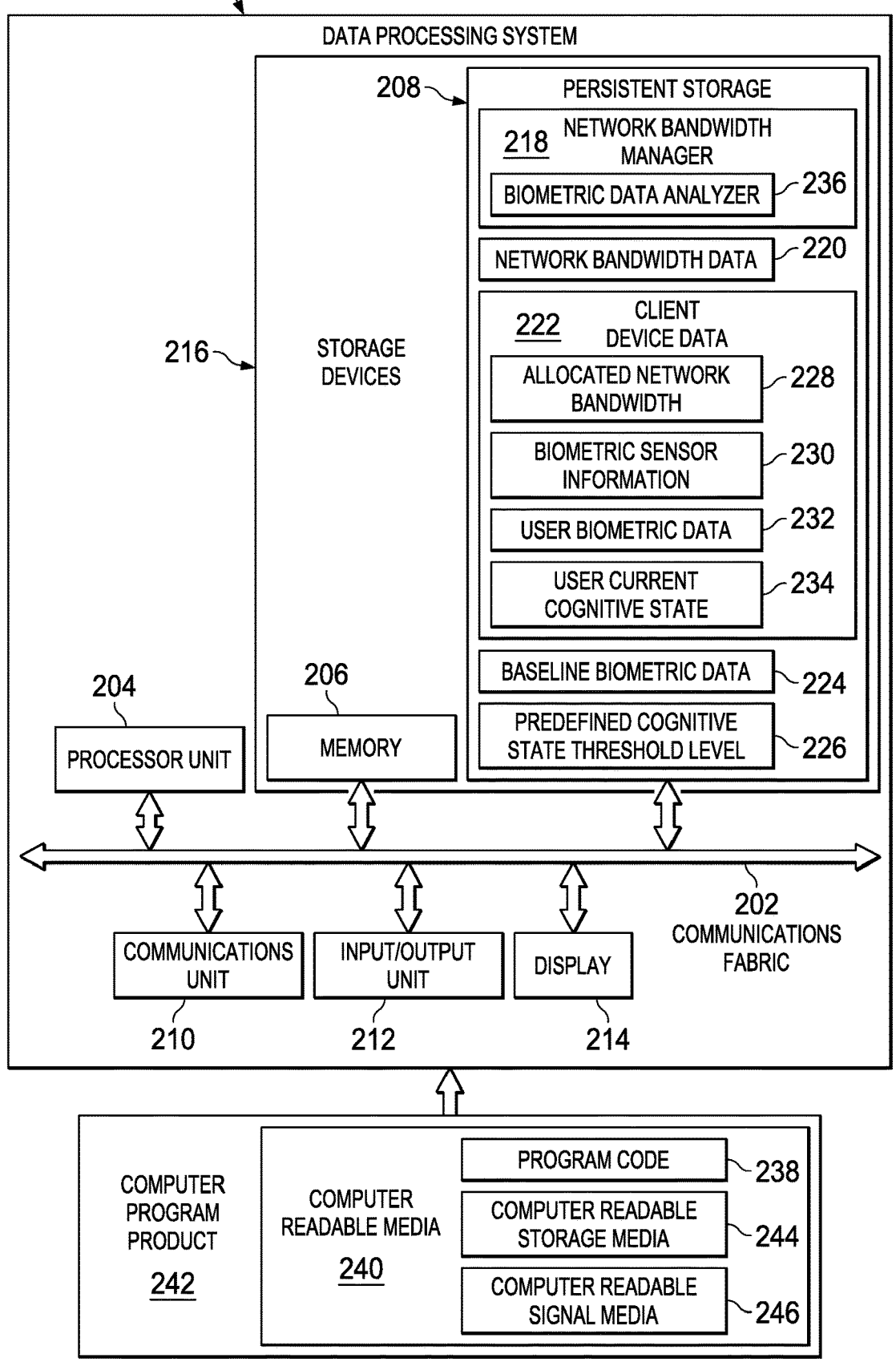
FIG. 2 is a diagram of a data processing system in which illustrative embodiments may be implemented.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. Server 104 may provide a set of one or more services to users of client devices connected to network 102. For example, server 104 may provide an online gaming service, a text messaging service, a voice communications service, a data retrieval service, and the like, to client devices. Also, it should be noted that server 104 may represent a plurality of different servers providing a plurality of different services to network 102 client device users. Further, server 104 may require authentication of login information prior to providing services to client device users.

Server 106 may adjust the amount or level of network bandwidth allocated to each of the different client devices connected to network 102 based on analyzing a cognitive state of each of the users of the client devices and the total amount of network bandwidth available. A cognitive state of a user may include, for example, a state of mind, a level of stress, a level of alertness, a level of relaxation, a level of attention, a level of distraction, an emotional state, and the like. Server 106 may analyze the cognitive state of each network user via information retrieved from biometric sensors communicatively coupled to each of the different client devices corresponding to respective users. The biometric sensors may measure, for example, hear rate, rate of respiration, skin temperature level, amount of pupil dilation, eye movements, facial expressions, speech patterns, voice level, and the like.

Client 110, client 112, and client 114 also connect to network 102. Clients 110, 112, and 114 are clients of server 104 and server 106. Further, server 104 and server 106 may provide information, such as boot files, operating system images, and software applications to clients 110, 112, and 114.

In this example, clients 110, 112, and 114 are illustrated as desktop computers, which may have wire or wireless communication links to network 102. However, it should be noted that clients 110, 112, and 114 are intended as examples only. In other words, clients 110, 112, and 114 also may include other devices, such as, for example, laptop computers, handheld computers, smart phones, smart watches, personal digital assistants, gaming devices, set-top boxes, kiosks, or any combination thereof.

Furthermore, clients 110, 112, and 114 include sensor 116, sensor 118, and sensor 120, respectively. In other words, sensors 116, 118, and 120 are a part of clients 110, 112, and 114. However, it should be noted that sensors 116, 118, and 120 may be separate from clients 110, 112, and 114. In other words, sensors 116, 118, and 120 are communicatively coupled to clients 110, 112, and 114 via wired communications links or wireless communications links. Each of sensor 116, sensor 118, and sensor 120 represent a set of one or more biometric sensors, such as, for example, image capturing devices, sound capturing device, temperature measuring devices, heart rate measuring device, brain activity measuring devices, movement measuring devices, and the like, which may collect any type of biometric data or samples corresponding to respective users of clients 110, 112, and 114. Also, the set of biometric sensors may include all future types of biometric sensors, which include wearable devices, that may capture any type of future biometrical data as well. Clients 110, 112, and 114 send information regarding sensors 116, 118, and 120, such as type of sensors and type of information collected by the sensors, to server 106 and allow server 106 to retrieve the biometric data collected by sensors 116, 118, and 120.

Storage 108 is a network storage device capable of storing any type of data in a structured format or an unstructured format. In addition, storage 108 may represent a set of one or more network storage devices. Storage 108 may store, for example, names and identification numbers for a plurality of different network users; identification of a plurality of different client devices corresponding to the different network users; profiles, which may contain demographic data, place of employment, job title, work schedule, hobbies, baseline user biometric data, and the like, corresponding to the different network users; network bandwidth allocation rules, historic network bandwidth usage patterns, predefined user cognitive state threshold levels, and the like. Further, storage 108 may store other data, such as authentication or credential data that may include user names, passwords, and biometric data associated with the plurality of different network users and network administrators, for example.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 106 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores network bandwidth manager 218. Network bandwidth manager 218 adjusts the network bandwidth allocated to different client devices connected to a network, such as clients 110, 112, and 114 connected to network 102 in FIG. 1, based on analyzing a cognitive state of each of the users of the client devices and the total amount of network bandwidth available to the client devices. It should be noted that even though network bandwidth manager 218 is illustrated as residing in persistent storage 208, in an alternative illustrative embodiment network bandwidth manager 218 may be a separate component of data processing system 200. For example, network bandwidth manager 218 may be a hardware component coupled to communication fabric 202 or a combination of hardware and software components.

In this example, persistent storage 208 also stores network bandwidth data 220, client device data 222, baseline biometric data 224, and predefined cognitive state threshold data 226. Network bandwidth data 220 represent information regarding a total amount of bandwidth that is available to allocate to different client devices connected to the network. Client device data 222 represent information regarding a particular client device that is currently connected to the network. However, it should be noted that client device data 222 may represent information regarding a plurality of different client devices connected to the network.

In this example, client device data 222 include allocated network bandwidth 228, biometric sensor information 230, user biometric data 232, and user current cognitive state 234. However, it should be noted that different illustrative embodiments may include more or less information in client device data 222 than illustrated. Allocated network bandwidth 228 represents an amount or level of network bandwidth that network bandwidth manager 218 is currently allocating to the particular client device. Biometric sensor information 230 represents information regarding a set of biometric sensors included with, and/or are communicatively coupled to, the particular client device that network bandwidth manager 218 is allowed access to by the particular client device.

User biometric data 232 represent biometric information, such as biometric samples or templates, corresponding to a particular user currently using the particular client device to access the network. Network bandwidth manager 218 utilizes biometric data analyzer 236 to analyze user biometric data 232 to determine user current cognitive state 234. User current cognitive state 234 represents the current cognitive state of the user of the particular client device based on the analysis of user biometric data 232. For example, user current cognitive state 234 may be alert and attentive to an online video conference with a company executive or may be distracted and stressed due to the online video conference breaking up because not enough network bandwidth is being allocated to the particular client device. In the latter case, network bandwidth manager 218 may increase allocated network bandwidth 228 to the particular client device to decrease the user's stress level and increase the user's satisfaction with the performance of the network.

Baseline biometric data 224 may represent baseline biometric data corresponding to the particular user that is currently using the particular client device. Illustrative embodiments may collect the user baseline biometric data during a user registration process and may store the user baseline biometric data in a profile corresponding to the user, for example. Baseline biometric data 224 also may represent baseline biometric data corresponding to a general population of network users. Network bandwidth manager 218 may utilize baseline biometric data 224 to compare with user biometric data 232 to determine user current cognitive state 234 (e.g., stressed, calm, relaxed, happy, sad, distracted, inattentive, alert, engaged, and the like). In addition, network bandwidth manager 218 may utilize predefined cognitive state threshold data 226 to determine when to adjust (e.g., increase or decrease) the amount or level of network bandwidth currently allocated to the particular client device. For example, if network bandwidth manger 218 determines that user current cognitive state 234 is greater than or equal to predefined cognitive state threshold level 226, then network bandwidth manage 218 may not adjust allocated network bandwidth 228 to the particular client device or may decrease allocated network bandwidth 228 to the particular client device when network bandwidth manager 218 determines that another client device connected to the network needs additional network bandwidth. Alternatively, if network bandwidth manger 218 determines that user current cognitive state 234 is less than or below predefined cognitive state threshold level 226, then network bandwidth manage 218 may increase allocated network bandwidth 228 to the particular client device.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (WiFi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code.

As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Today, data network over-usage is a common problem in commercial and consumer networks driving consistent stress for businesses and users. Dealing with slow data networks is common place in many businesses, airports, and residences when it comes to heavy usage at peak times. Quality of service (QoS) rules currently exist that can be set in a router for different types of data traffic over a network, but the router does not take into consideration any human factors, such as cognitive state of network users, in prioritizing the data traffic over the network. The ability to manage networks through autonomic means based on the cognitive state of the user or users is not currently offered within presently existing networks.

Current network technology does not address an overall cognitive approach based on biometrics and biometry in any form. Illustrative embodiments are based on human biometry and biometric analysis for optimizing data network paths and data flow within a network. Biometry is the statistical analysis of biometric data. Illustrative embodiments focus on taking biometric data already collected from network users and harnessing this collected biometric data to prioritize data transmission (i.e., bandwidth allocation) based on machine learning and applied rules for optimization of data networks over time.

Illustrative embodiments monitor the cognitive state (e.g., state of mind, stress level, alertness, relaxation level, attention level, distraction level, emotional state, et cetera) of network users to influence the allocation of network bandwidth to different devices connected to the network. Illustrative embodiments by pro-actively shifting different amounts of bandwidth allocation to different devices within a network, illustrative embodiments may potentially eliminate or decrease network usage constraints and network stress to users. Illustrative embodiments by being able to predict potential network issues and react in real time will be of great value to network users. Some factors that illustrative embodiments may consider, but are not limited to, in adjusting network bandwidth allocation are: 1) time of day; 2) profession of user or sense of urgency; 3) contention or conflict over access to shared resources on the network; 4) type of network traffic (e.g., gaming, email, voice communication, text messaging, video, et cetera); 5) stress levels of the user (e.g., increased heart rate, blood pressure, skin temperature, et cetera); and 6) any type of biometrical data that is currently collected or may be collected by wearables or personal devices in the future.

Illustrative embodiments may monitor the stress level of a user via a set of one or more biometric sensor devices communicatively coupled to a data processing system that the user is using to access the network. The set of biometric sensors may be integral with the data processing system or may be separate from the data processing system. If one or more of the set of biometric sensors is separate from the data processing system of the user, then the biometric sensors may be in communication with the data processing system via wire communication links and/or wireless communication links. In addition, the separate biometric sensors may be included in "wearables", such as smart watches, eye glasses, articles of clothing, exercise monitoring devices located on a user's body, and the like.

Illustrative embodiments identify the cognitive or mental state of a client device user through biometry and biometric sample collection and analysis. Further, illustrative embodiments modify the network to optimize the data traffic flow via adjustment of network bandwidth to different client devices connected to the network based on the biometric analysis of the different client device users. Through data analytics and introduction of machine learning methods, illustrative embodiments may quickly "learn" and baseline the user's cognitive mental state and type of network usage (e.g., business, pleasure, education, et cetera) and then continually monitor and determine the user's cognitive state against the type of network usage. This process can start when the user joins the network and continue progressively throughout the user's usage lifecycle on the shared network.

As a network user's frustration level rises, illustrative embodiments may automatically provision more network bandwidth to a particular device on demand to resolve the user's frustration. In other words, illustrative embodiments may effectively "throttle" the amount of a user's network usage (i.e., adjust network bandwidth used by the client device of the user) relative to certain baselines, rules, and machine learning. Over time, illustrative embodiments may optimize manipulation of the network based on cognitive machine learning, data analytics, and statistical deduction weighted over time. As a result, illustrative embodiments create a smarter solution for real time management of network loads, which may supplement rather than replace existing bandwidth optimization methods. In summary, illustrative embodiments re-prioritize network bandwidth usage by devices connected to the network using an analysis of the cognitive states of different device users.

Three example network use cases of illustrative embodiments follow. The first use case is a medical emergency network use example. Illustrative embodiments treat medical emergencies as critical and time sensitive. In other words, illustrative embodiments will assign any medical emergency with a higher priority value within a network. Illustrative embodiments may utilize data analytics and machine learning to identify a medical emergency situation based upon the type of data flowing through the network.

The second use case is an airport terminal network use example where a large community of users is on a public WiFi network within the airport terminal. Illustrative embodiments consider the types of users within the community, baselines of user cognitive states, and defined network bandwidth allocation rules for increasing or decreasing in real time the level of network bandwidth used by each of the different devices connected to the entire public WiFi network within the airport terminal. For example, illustrative embodiments may increase network bandwidth to a device corresponding to a business user connected to the airport terminal WiFi network when illustrative embodiments determine that the business user is experiencing an increased heart rate with elevated biometric values while decreasing the network bandwidth to a device corresponding to a six year old happily playing an online game.

The third use case is a streaming video consumer use example in a residence network. Within a family of five people, for example, there is a video consumer consuming all the network bandwidth within the residence. Typically, video consumers are heavy users of network bandwidth. Beyond current network solutions that cap the network bandwidth usage by the online video consumer at a fixed position or rate, illustrative embodiments may allow all available network bandwidth to be provisioned to the online video consumer unless other users within the residence are competing for network bandwidth at that particular point in time. Illustrative embodiments detect the other users wanting network bandwidth within the residence and appropriately prioritize the network bandwidth usage by the different devices corresponding to the respective users based upon type of network usage and cognitive state of each of the different users as determined by biometric analysis.

Thus, illustrative embodiments measure the current cognitive state of each network user and then prioritize those users against all currently active and identified users on the network and adjusting network bandwidth based on the collective cognitive state. In other words, illustrative embodiments determine when a network user is satisfied or dissatisfied with the performance of the network. If the network, itself, or outside factors are causing stress or other cognitive state changes to a network user, then illustrative embodiments will make network bandwidth adjustments accordingly. These network bandwidth adjustments do not have to occur in isolation, but may supplement existing network bandwidth management policies.

Figure 3:
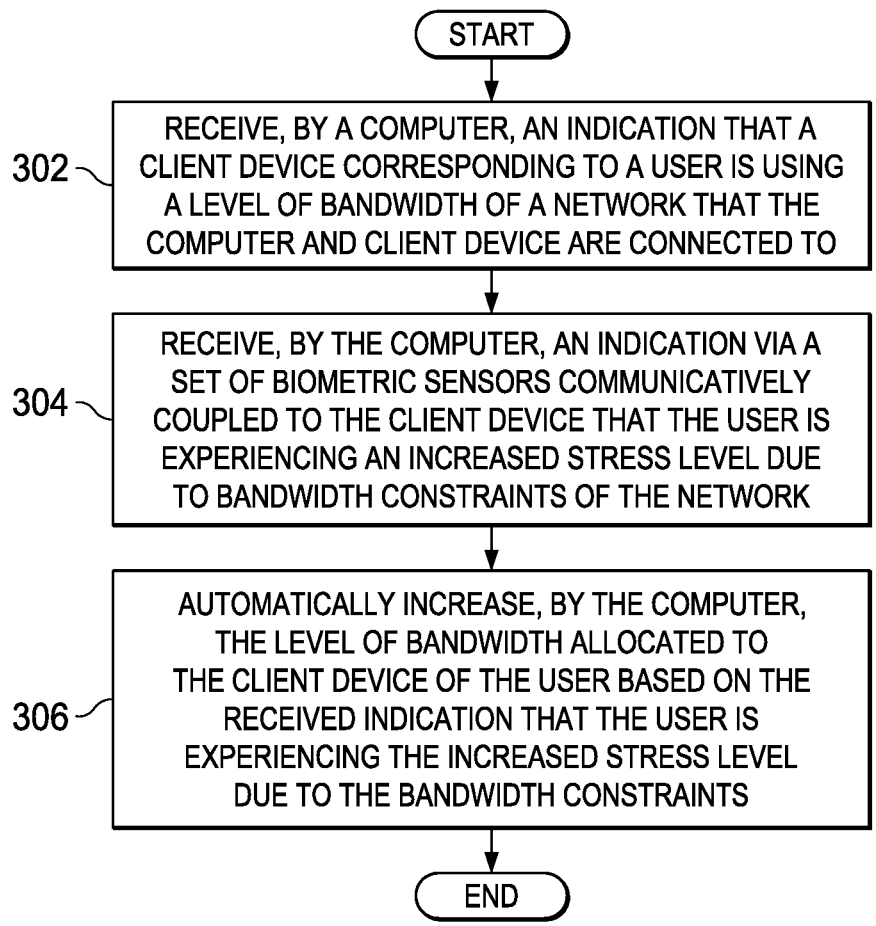
FIG. 3 is a flowchart illustrating a process for automatically increasing network bandwidth allocated to a client device in accordance with an illustrative embodiment.

With reference now to FIG. 3, a flowchart illustrating a process for automatically increasing network bandwidth allocated to a client device is shown in accordance with an illustrative embodiment. The process shown in FIG. 3 may be implemented in a computer, such as, for example, server 106 in FIG. 1 and data processing system 200 in FIG. 2.

The process begins when the computer receives an indication that a client device corresponding to a user is using a level of bandwidth of a network that the computer and client device are connected to (step 302). The client device may be, for example, client 110 in FIG. 1. The network may be, for example, network 102 in FIG. 1. The level of bandwidth may be, for example, allocated network bandwidth 228 in FIG. 2.

In addition, the computer receives an indication via a set of biometric sensors communicatively coupled to the client device that the user is experiencing an increased stress level due to bandwidth constraints of the network (step 304). The set of biometric sensors may be, for example, sensor 116 in FIG. 1. In response to the computer receiving the indication that the user is experiencing an increased stress level in step 304, the computer automatically increases the level of bandwidth allocated to the client device of the user based on the received indication that the user is experiencing the increased stress level due to the bandwidth constraints (step 306). Thereafter, the process terminates.

Figure 4B:
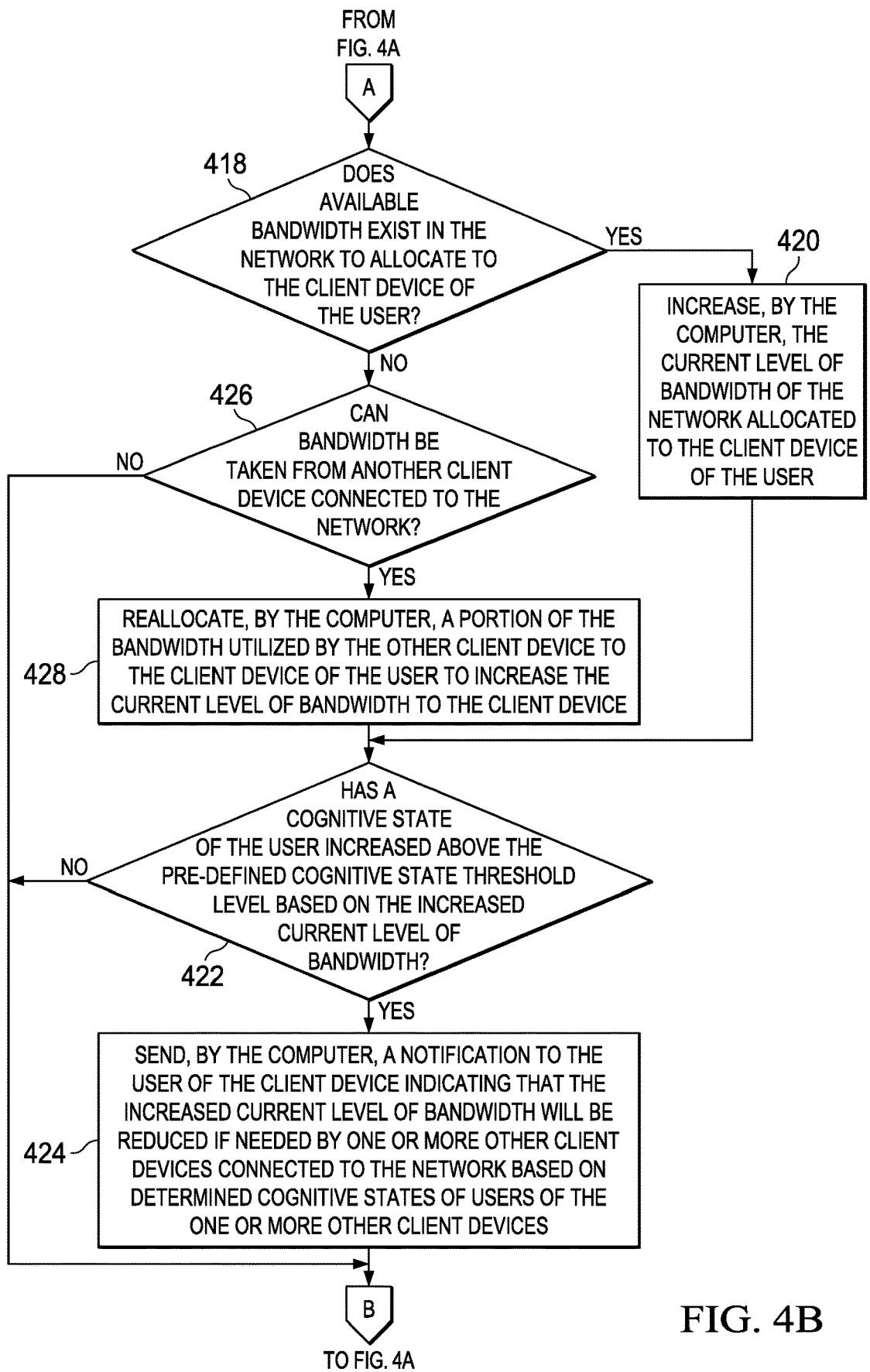

With reference now to FIGS. 4A-4B, a flowchart illustrating a process for a server device is shown in accordance with an illustrative embodiment. The process shown in FIGS. 4A-4B may be implemented in a computer, such as, for example, server 106 in FIG. 1 and data processing system 200 in FIG. 2.

The process begins when the computer receives an indication that a client device corresponding to a user is logged in to a network (step 402). The client device may be, for example, client 110 in FIG. 1. The network may be, for example, network 102 in FIG. 1.

After receiving the indication that the client device is logged in to the network in step 402, the computer requests information regarding a set of biometric sensors communicatively coupled to the client device of the user that the computer is authorized to access (step 404). The set of biometric sensors may be, for example, sensor 116 in FIG. 1. Subsequently, the computer receives the information from the client device regarding the set of biometric sensors that the computer is authorized to access (step 406).

Then, the computer accesses the set of biometric sensors to retrieve biometric data corresponding to the user of the client device (step 408). The biometric data corresponding to the user of the client device may be, for example, user biometric data 232 in FIG. 2. In addition, the computer determines a current cognitive state of the user based on analyzing the biometric data retrieved from the set of biometric sensors communicatively coupled to the client device (step 410). The current cognitive state of the user may be, for example, user current cognitive state 234 in FIG. 2.

Further, the computer determines a current level of bandwidth of the network that is allocated to the client device (step 412). The current level of bandwidth of the network that is allocated to the client device may be, for example, allocated network bandwidth 228 in FIG. 2. Furthermore, the computer compares the current cognitive state of the user with a pre-defined cognitive state threshold level (step 414). The pre-defined cognitive state threshold level may be, for example, pre-defined cognitive state threshold level 226 in FIG. 2.

Afterward, the computer makes a determination as to whether the current cognitive state of the user is below or less than the pre-defined cognitive state threshold level (step 416). If the computer determines that the current cognitive state of the user is below the pre-defined cognitive state threshold level, yes output of step 416, then the computer makes a determination as to whether available bandwidth exists in the network to allocate to the client device of the user (step 418). If the computer determines that available bandwidth does exist in the network to allocate to the client device of the user, yes output of step 418, then the computer increases the current level of bandwidth of the network allocated to the client device of the user (step 420). Afterward, the computer makes a determination as to whether a cognitive state of the user increased above the pre-defined cognitive state threshold level based on the increased current level of bandwidth (step 422). If the computer determines that the cognitive state of the user did increase above the pre-defined cognitive state threshold level based on the increased current level of bandwidth, yes output of step 422, then the computer sends a notification to the user of the client device indicating that the increased current level of bandwidth will be reduced if needed by one or more other client devices connected to the network based on determined cognitive states of users of the one or more other client devices (step 424) and the process returns to step 408 thereafter. If the computer determines that the cognitive state of the user did not increase above the pre-defined cognitive state threshold level based on the increased current level of bandwidth, no output of step 424, then the process returns to step 408 where the computer continues to access the set of biometric sensors to retrieve the biometric data corresponding to the user of the client device.

Returning again to step 418, if the computer determines that available bandwidth does not exist in the network to allocate to the client device of the user, no output of step 418, then the computer makes a determination as to whether bandwidth can be taken from another client device connected to the network (step 426). If the computer determines that bandwidth can be taken from another client device connected to the network, yes output of step 426, then the computer reallocates a portion of the bandwidth utilized by the other client device to the client device of the user to increase the current level of bandwidth to the client device (step 428). Thereafter, the process returns to step 422 where the computer makes a determination as to whether a cognitive state of the user increased above the pre-defined cognitive state threshold level based on the increased current level of bandwidth. If the computer determines that bandwidth cannot be taken from another client device connected to the network, no output of step 426, then the process returns to step 408 where the computer continues to access the set of biometric sensors to retrieve the biometric data corresponding to the user of the client device.

Returning again to step 416, if the computer determines that the current cognitive state of the user is greater than or equal to the pre-defined cognitive state threshold level, no output of step 416, then the computer makes a determination as to whether an indication that the client device is logged out of the network was received (step 430). If the computer determines that the computer did not receive an indication that the client device is logged out of the network, no output of step 430, then the process returns to step 408 where the computer continues to access the set of biometric sensors to retrieve the biometric data corresponding to the user of the client device. If the computer determines that the computer did receive an indication that the client device is logged out of the network, yes output of step 430, then the process terminates thereafter.

Figure 5:
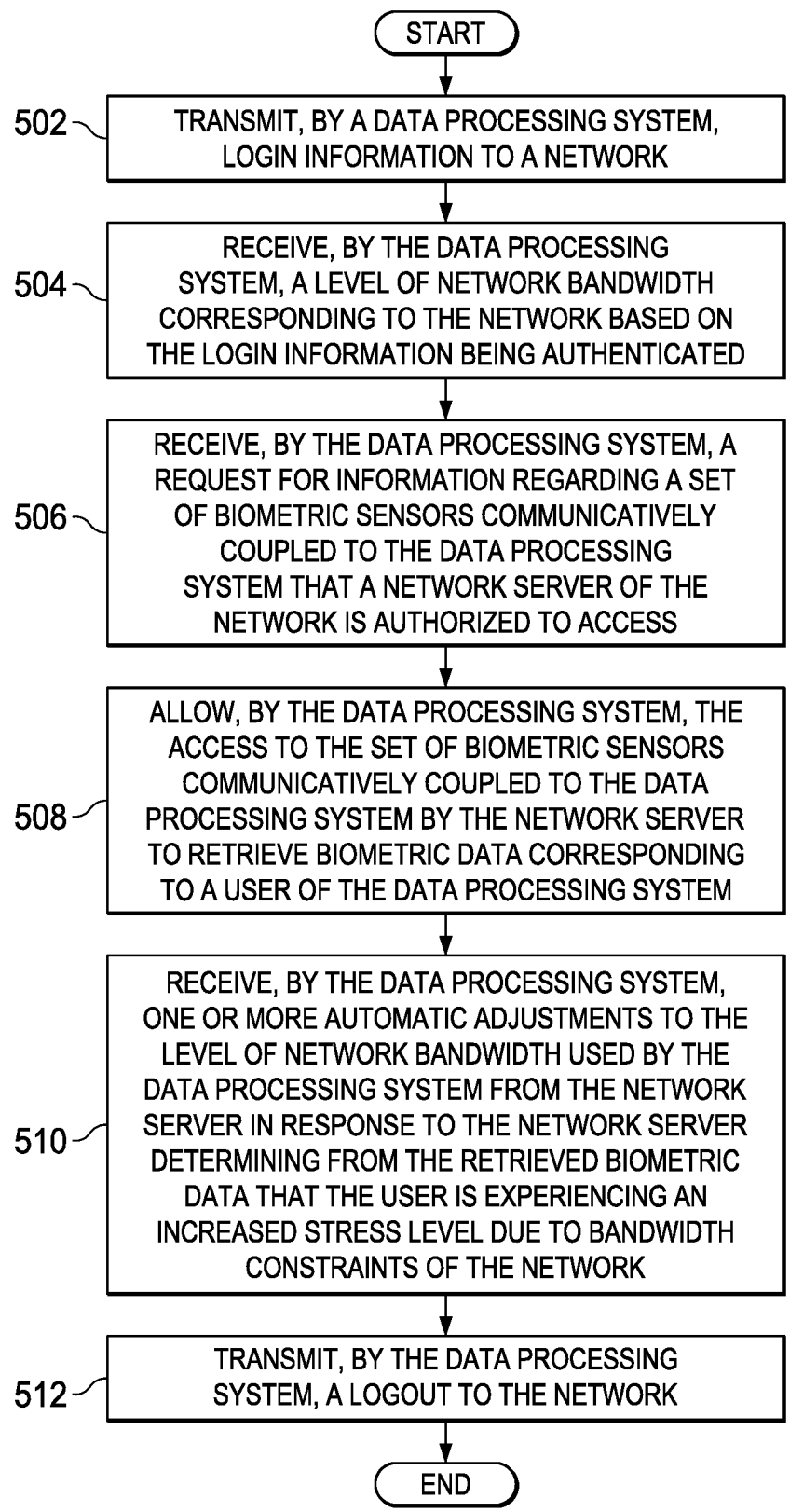
FIG. 5 is a flowchart illustrating a process for a client device in accordance with an illustrative embodiment.

With reference now to FIG. 5, a flowchart illustrating a process for a client device is shown in accordance with an illustrative embodiment. The process shown in FIG. 5 may be implemented in a client data processing system, such as, for example, client 110 in FIG. 1.

The process begins when the data processing system transmits login information to a network (step 502). The data processing system may transmit the login information to the network via, for example, WiFi or some other means. The login information may be, for example, user name, password, and/or biometric data corresponding to a user of the data processing system. The network may be, for example, network 102 in FIG. 1.

Subsequently, the data processing system receives a level of network bandwidth corresponding to the network based on the login information being authenticated (step 504). Further, the data processing system receives a request for information regarding a set of biometric sensors communicatively coupled to the data processing system that a network server of the network is authorized to access (step 506). The set of biometric sensors may be, for example, sensor 116 in FIG. 1. The network server may be, for example, server 106 in FIG. 1.

Furthermore, the data processing system allows the access to the set of biometric sensors communicatively coupled to the data processing system by the network server to retrieve biometric data corresponding to a user of the data processing system (step 508). The biometric data corresponding to the user of the data processing system may be, for example, user biometric data 232 in FIG. 2. Afterward, the data processing system receives one or more automatic adjustments to the level of network bandwidth used by the data processing system from the network server in response to the network server determining from the retrieved biometric data that the user is experiencing an increased stress level due to bandwidth constraints of the network (step 510). Subsequently, the data processing system transmits a logout to the network (step 512) and the process terminates thereafter.

Thus, illustrative embodiments of the present invention provide a computer-implemented method, computer system, and computer program product for adjusting a level of network bandwidth used by a device based on analyzing a cognitive state of a user of the device. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for adjusting network bandwidth, the computer-implemented method comprising:
receiving, by a computer, an indication that a client device corresponding to a user is using a level of bandwidth of a network that the computer and client device are connected to;
receiving, by the computer, an indication via a set of biometric sensors communicatively coupled to the client device that the user is experiencing an increased stress level;
increasing, by the computer, the level of bandwidth allocated to the client device of the user based on the received indication that the user is experiencing the increased stress level;
determining, by the computer, whether a cognitive state of the user increased above a pre-defined cognitive state threshold level based on the increased level of bandwidth allocated to the client device of the user;

responsive to the computer determining that the cognitive state of the user increased above the pre-defined cognitive state threshold level based on the increased level of bandwidth allocated to the client device of the user, sending, by the computer, a notification to the user of the client device indicating that the increased level of bandwidth allocated to the client device of the user will be reduced when additional bandwidth is needed by one or more other client devices connected to the network based on determined cognitive states of users of the one or more other client devices;

responsive to the computer determining that the current cognitive state of the user is below the pre-defined cognitive state threshold level, determining, by the computer, whether available bandwidth exists in the network to allocate to the client device of the user;

responsive to the computer determining that available bandwidth does exist in the network to allocate to the client device of the user, increasing, by the computer, a current level of bandwidth of the network allocated to the client device of the user;

responsive to the computer determining that available bandwidth does not exist in the network to allocate to the client device of the user, determining, by the computer, whether bandwidth can be taken from another client device connected to the network; and responsive to the computer determining that bandwidth can be taken from another client device connected to the network, reallocating, by the computer, a portion of the bandwidth utilized by the other client device to the client device of the user to increase the current level of bandwidth to the client device and sending, by the computer, a notification to the user of the client device indicating that the portion of the bandwidth utilized by the other client device will be reallocated to the client device of the user.

2. The computer-implemented method of claim 1 further comprising:

receiving, by the computer, an indication that the client device corresponding to the user is logged in to the network;

responsive to the computer receiving the indication that the client device is logged in to the network, requesting, by the computer, information regarding the set of biometric sensors communicatively coupled to the client device of the user that the computer is authorized to access; and receiving, by the computer, the information from the client device regarding the set of biometric sensors that the computer is authorized to access.

3. The computer-implemented method of claim 2 further comprising:

accessing, by the computer, the set of biometric sensors to retrieve biometric data corresponding to the user of the client device; and determining, by the computer, a current cognitive state of the user based on analyzing the biometric data retrieved from the set of biometric sensors communicatively coupled to the client device.

4. The computer-implemented method of claim 3 further comprising:

comparing, by the computer, the current cognitive state of the user with the pre-defined cognitive state threshold level; and determining, by the computer, whether the current cognitive state of the user is below the pre-defined cognitive state threshold level.

5. The computer-implemented method of claim 1 further comprising:

determining, by the computer, a current level of bandwidth of the network that is allocated to the client device.

6. The computer-implemented method of claim 1, wherein the computer considers a type of network traffic transmitted by the client device corresponding to the user when adjusting the level of bandwidth allocated to the client device.

7. The computer-implemented method of claim 1, wherein the set of biometric sensors communicatively coupled to the client device of the user is included in wearables located on a body of the user.

8. A computer system for adjusting network bandwidth, the computer system comprising:

a bus system;

a storage device connected to the bus system, wherein the storage device stores program instructions; and a processor connected to the bus system, wherein the processor executes the program instructions to:

receive an indication that a client device corresponding to a user is using a level of bandwidth of a network that the computer system and client device are connected to;

receive an indication via a set of biometric sensors communicatively coupled to the client device that the user is experiencing an increased stress level;

increase the level of bandwidth allocated to the client device of the user based on the received indication that the user is experiencing the increased stress level;

determine whether a cognitive state of the user increased above a pre-defined cognitive state threshold level based on the increased level of bandwidth allocated to the client device of the user;

send a notification to the user of the client device indicating that the increased level of bandwidth allocated to the client device of the user will be reduced when additional bandwidth is needed by one or more other client devices connected to the network based on determined cognitive states of users of the one or more other client devices in response to determining that the cognitive state of the user increased above the pre-defined cognitive state threshold level based on the increased level of bandwidth allocated to the client device of the user;

determine whether available bandwidth exists in the network to allocate to the client device of the user in response to determining that the current cognitive state of the user is below the pre-defined cognitive state threshold level;

increase a current level of bandwidth of the network allocated to the client device of the user in response to determining that available bandwidth does exist in the network to allocate to the client device of the user;

determine whether bandwidth can be taken from another client device connected to the network in response to determining that available bandwidth does not exist in the network to allocate to the client device of the user; and reallocate a portion of the bandwidth utilized by the other client device to the client device of the user to increase the current level of bandwidth to the client device and send a notification to the user of the client device indicating that the portion of the bandwidth utilized by the other client device will be reallocated to the client device of the user in response to determining that bandwidth can be taken from another client device connected to the network.

9. The computer system of claim 8, wherein the processor further executes the program instructions to:
receive an indication that the client device corresponding to the user is logged in to the network;
request information regarding the set of biometric sensors communicatively coupled to the client device of the user that the computer system is authorized to access in response to receiving the indication that the client device is logged in to the network; and
receive the information from the client device regarding the set of biometric sensors that the computer system is authorized to access.

10. The computer system of claim 9, wherein the processor further executes the program instructions to:
access the set of biometric sensors to retrieve biometric data corresponding to the user of the client device; and
determine a current cognitive state of the user based on analyzing the biometric data retrieved from the set of biometric sensors communicatively coupled to the client device.

11. A computer program product for adjusting network bandwidth, the computer program product comprising a computer readable storage medium having program instructions embodied therewith, the program instructions executable by a computer to cause the computer to perform a method comprising:
receiving, by the computer, an indication that a client device corresponding to a user is using a level of bandwidth of a network that the computer and client device are connected to;
receiving, by the computer, an indication via a set of biometric sensors communicatively coupled to the client device that the user is experiencing an increased stress level;
increasing, by the computer, the level of bandwidth allocated to the client device of the user based on the received indication that the user is experiencing the increased stress level;
determining, by the computer, whether a cognitive state of the user increased above a pre-defined cognitive state threshold level based on the increased level of bandwidth allocated to the client device of the user;
responsive to the computer determining that the cognitive state of the user increased above the pre-defined cognitive state threshold level based on the increased level of bandwidth allocated to the client device of the user, sending, by the computer, a notification to the user of the client device indicating that the increased level of bandwidth allocated to the client device of the user will be reduced when additional bandwidth is needed by one or more other client devices connected to the network based on determined cognitive states of users of the one or more other client devices;
responsive to the computer determining that the current cognitive state of the user is below the pre-defined cognitive state threshold level, determining, by the computer, whether available bandwidth exists in the network to allocate to the client device of the user;
responsive to the computer determining that available bandwidth does exist in the network to allocate to the client device of the user, increasing, by the computer, a current level of bandwidth of the network allocated to the client device of the user;
responsive to the computer determining that available bandwidth does not exist in the network to allocate to the client device of the user, determining, by the computer, whether bandwidth can be taken from another client device connected to the network; and
responsive to the computer determining that bandwidth can be taken from another client device connected to the network, reallocating, by the computer, a portion of the bandwidth utilized by the other client device to the client device of the user to increase the current level of bandwidth to the client device and sending, by the computer, a notification to the user of the client device indicating that the portion of the bandwidth utilized by the other client device will be reallocated to the client device of the user.

12. The computer program product of claim 11 further comprising:
receiving, by the computer, an indication that the client device corresponding to the user is logged in to the network;
responsive to the computer receiving the indication that the client device is logged in to the network, requesting, by the computer, information regarding the set of biometric sensors communicatively coupled to the client device of the user that the computer is authorized to access; and
receiving, by the computer, the information from the client device regarding the set of biometric sensors that the computer is authorized to access.

13. The computer program product of claim 12 further comprising:
accessing, by the computer, the set of biometric sensors to retrieve biometric data corresponding to the user of the client device; and
determining, by the computer, a current cognitive state of the user based on analyzing the biometric data retrieved from the set of biometric sensors communicatively coupled to the client device.

14. The computer program product of claim 13 further comprising:
comparing, by the computer, the current cognitive state of the user with the pre-defined cognitive state threshold level; and
determining, by the computer, whether the current cognitive state of the user is below the pre-defined cognitive state threshold level.

* * * * *